Feb. 12, 1963 J. B. OWENS 3,077,526

CIRCUIT INTERRUPTING DEVICE

Original Filed Sept. 23, 1953 5 Sheets-Sheet 1

INVENTOR

James B. Owens.

BY

Willard R. Crout

ATTORNEY

CIRCUIT INTERRUPTING DEVICE

Original Filed Sept. 23, 1953 5 Sheets-Sheet 2

INVENTOR
James B. Owens.
BY
Willard R. Crout
ATTORNEY

CIRCUIT INTERRUPTING DEVICE

Original Filed Sept. 23, 1953 5 Sheets-Sheet 3

INVENTOR

James B. Owens.

BY

Willard R. Crout

ATTORNEY

INVENTOR
James B. Owens.
BY
Willard R. Crout
ATTORNEY

INVENTOR
James B. Owens.
BY
Willard R. Crout
ATTORNEY 3,077,526
CIRCUIT INTERRUPTING DEVICE James B. Owens, Eastwood, Hempfield Township, Westmoreland County, Pa., assignor to Westinghouse Electric Corporation, East Pittsburgh, Pa., a corporation of Pennsylvania Original application Sept. 23, 1953, Ser. No. 381,937, now Patent No. 2,911,506, dated Nov. 3, 1959. Divided and this application Oct. 22, 1958, Ser. No. 768,913
8 Claims. (Cl. 200—148)

This invention relates to circuit-interrupting devices in general, and more particularly to disconnecting switches, with particular relation to disconnecting switches that are adapted to be opened under load conditions.

This application is a division of my patent application filed September 23, 1953, Serial No. 381,937, now United States Patent 2,911,506, issued November 3, 1959, entitled "Circuit Interrupting Device," and assigned to the assignee of the instant application.

Disconnecting switches are made to isolate electrical circuits or equipment for examination, maintenance and repair. These switches are not designed to serve as circuit-interrupting devices, and are usually operated only after the current flowing through them is reduced to zero by opening the circuits to all loads by means of circuit breakers. They are sometimes used to interrupt very small currents such as the magnetizing current to a transformer, or the charging current to a bus structure or transmission line. Even such light interrupting duty represents a hazard since unconfined electric arcs are attendant to such operation. Under favorable conditions these arcs can cause flashovers resulting in faults on the electrical system.

It is a general object of my invention to provide an improved load-interrupter switch, particularly one of the outdoor type, which will consist essentially of a disconnecting switch of generally conventional style constructed in conjunction with a suitable interrupting device.

In U.S. patent application filed October 26, 1951, Serial No. 253,321, now United States Patent 2,769,063, issued October 30, 1956, to Harry J. Lingal, entitled "Circuit Interrupting Device," and assigned to the assignee of the instant application, there is disclosed and claimed a circuit-interrupting device of the type consisting of a suitable disconnecting switch and an interrupting device utilized to interrupt load currents. It is a further object of my invention to provide an improved load-break disconnecting switch of the general type set out in the aforesaid application, which will have an improved and more effective operating mechanism, will be cheaper to manufacture in quantity production, and will render improved and more effective performance.

Another object is to provide an improved resilient mounting construction for the stationary contact of a circuit interrupting device, so that hammering of the stationary contact will be avoided during the closing operation.

Still a further object is to provide an improved piston-operated interrupting device having incorporated therein an improved and more effective construction to prevent flashover between the movable and stationary contacts during the opening operation.

Yet a further object is to provide an improved interrupting device in which the interrupter and mechanism may be assembled and tested before being placed within the weatherproof casing for final installation.

A more specific object is to provide an improved shield for the moving contact of an interrupting device to eliminate electrical breakdown around the orifice of such a device.

Another object of the present invention is to provide an improved sealing sleeve construction for bringing a rotative operating shaft into a sealed casing.

Further objects and advantages will readily become apparent upon reading the following specification, taken in conjunction with the drawings in which.

Figures 1, 2:
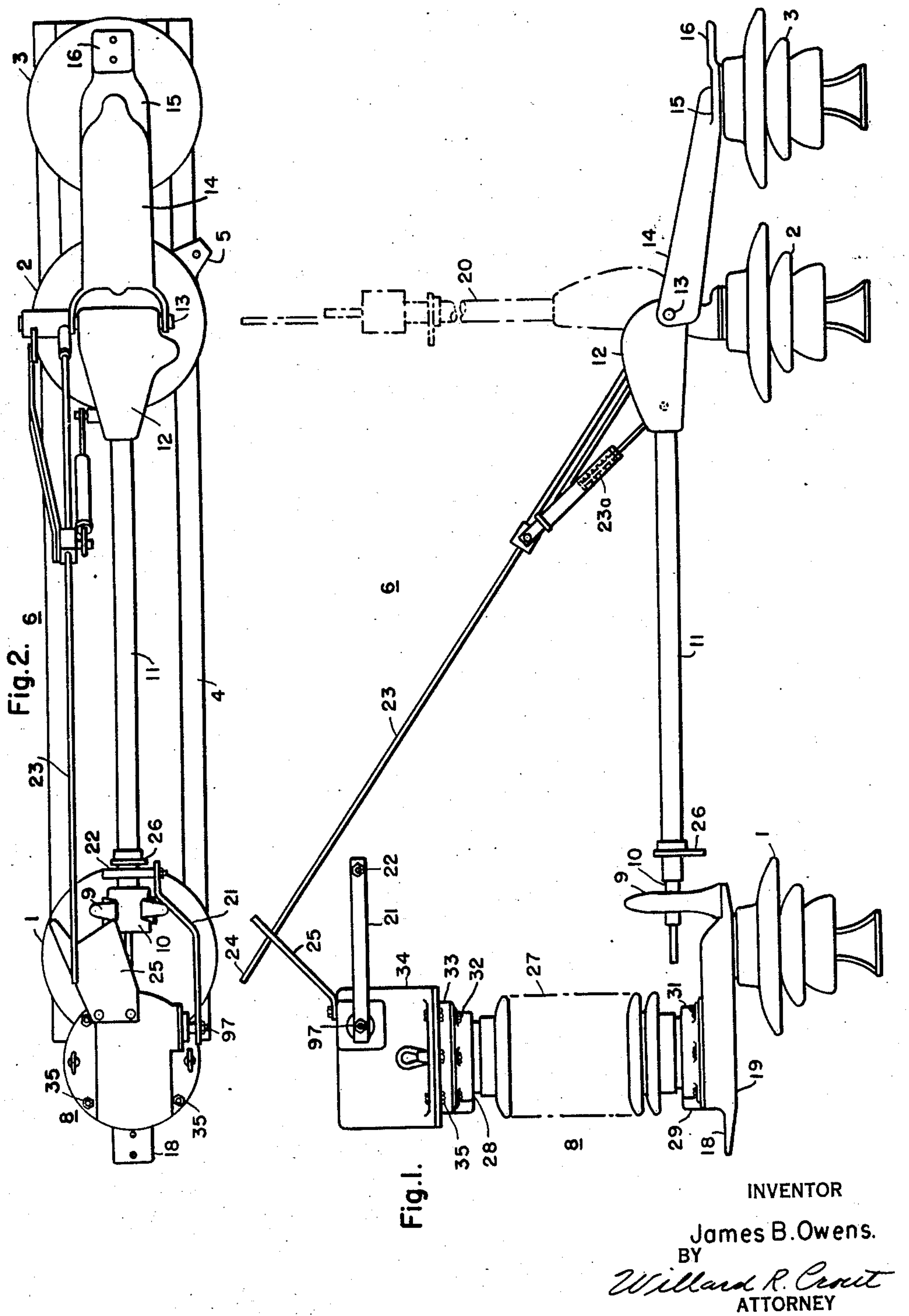
FIGURE 1 is a side elevational view of the improved load-break disconnecting switch of my invention, the apparatus being shown in the closed-circuit position.
FIG. 2 is a top plan view of the interrupting device shown in FIG. 1.

Referring to the drawings, and more particularly to FIGS. 1 and 2 thereof, it will be observed that there are provided three stacks of insulator columns 1, 2 and 3 supported upon a suitable base structure 4 (FIG. 2). The insulator stacks 1, 2 and 3 may extend upwardly a considerable distance from the base structure 4 when the switch is utilized on a high-voltage circuit. Preferably the insulator columns 1 and 3 are fixed, whereas the insulator column 2 is adapted for rotating movement by a crank arm 5, to effect thereby operation of the mechanism for the load-break disconnecting switch, generally designated by the reference numeral 6, and which is supported at the upper ends of the insulator columns 1—3.

Supported at the top of stationary insulator column 1 is an arc-extinguishing interrupting device, generally designated by the reference numeral 8. Also supported at the top of the stationary insulator column 1 is a relatively stationary switch jaw contact, designated by the reference numeral 9, and which cooperates with the contacting end 10 of a disconnecting switch blade 11, which is secured to a cam housing 12, the latter being pivotally supported by trunnions 13. The trunnions 13 extend inwardly from a support casting 14, which has an extension 15 including a line terminal plate 16.

The other line terminal plate of the load-break disconnecting switch 6 is designated by the reference numeral 18, and constitutes an extension of a support casting 19 fixedly supported at the top of insulator column 1. Thus, the circuit passes through the disconnecting switch 6 from line terminal plate 18, support casting 19, stationary jaw contact 9, movable contact 10 of switch blade 11, through the switch blade 11 to conducting cam housing 12, and thence through trunnions 13 and support casting 14 to the line terminal plate 16.

As is well known to those skilled in the art, suitable means are provided to first rotate the blade 11 about its longitudinal axis to release the contact pressure at jaw 9, and then effect upward swinging opening motion of the switch blade 11 about its pivot 13 to the open-circuit position, as indicated by the chain lines 20 of FIG. 1. In this position a long isolating gap in air is provided between the switch contacts at opposite potential.

It will be observed that an operator, or operating crank arm 21 extends laterally outwardly from the arc-extinguishing interrupting device 8, as more clearly shown in FIGS. 1 and 2. The operating crank arm 21 has an actuating pin 22 secured to the outer free end thereof and forming only a single end portion therefor. During the opening operation the end 10 of the main switch blade 11 strikes the actuating pin 22 to cause partial counterclockwise rotation of the operator, or operating arm 21 about its pivot, as shown in FIG. 1, to effect the initiation of the operating mechanism for the interrupting device 8, as more fully explained hereinafter.

Also associated with the main switch blade 11 is an auxiliary contact arm 23, mounted along the pivot axis 13 for the switch blade 11 and making contact at its outer free end 24 with an upper terminal 25 for the arc-extinguishing interrupting device 8. The auxiliary contact arm 23 is biased by a compression spring 23*a* toward the switch blade 11.

The main switch blade 11 also carries a laterally extending hook 26, which serves to pick up the auxiliary contact arm 23 during the opening operation, as more fully explained hereinafter.

Figures 3, 4, 10, 13:
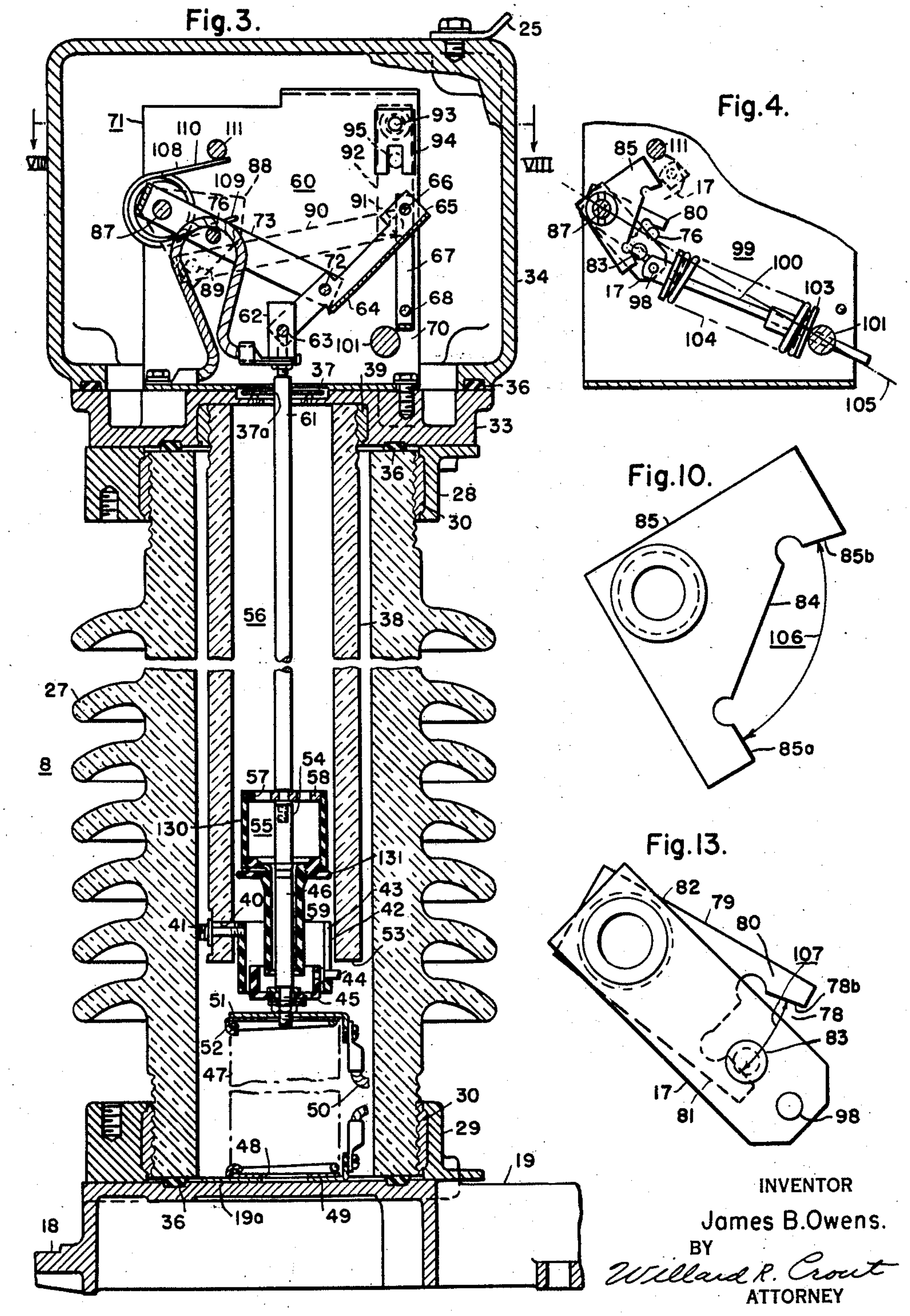
FIG. 3 is an enlarged vertical sectional view through the interrupting device of my improved load-break disconnecting switch, the contact structure being shown in the closed-circuit position.
FIG. 4 is a fragmentary, partially sectional view of the overcenter biasing means employed in the mechanism of the invention, the parts being shown in the closed-circuit position corresponding with that shown in FIG. 3 of the drawings.
FIG. 10 is an enlarged view of one of the operators or operating lever arms utilized in the mechanism.
FIG. 13 is a side elevational view of a unitary assembly, or an actuator or operator and its associated lever crank arm utilized in the improved mechanism.
Figures 8, 11, 12:
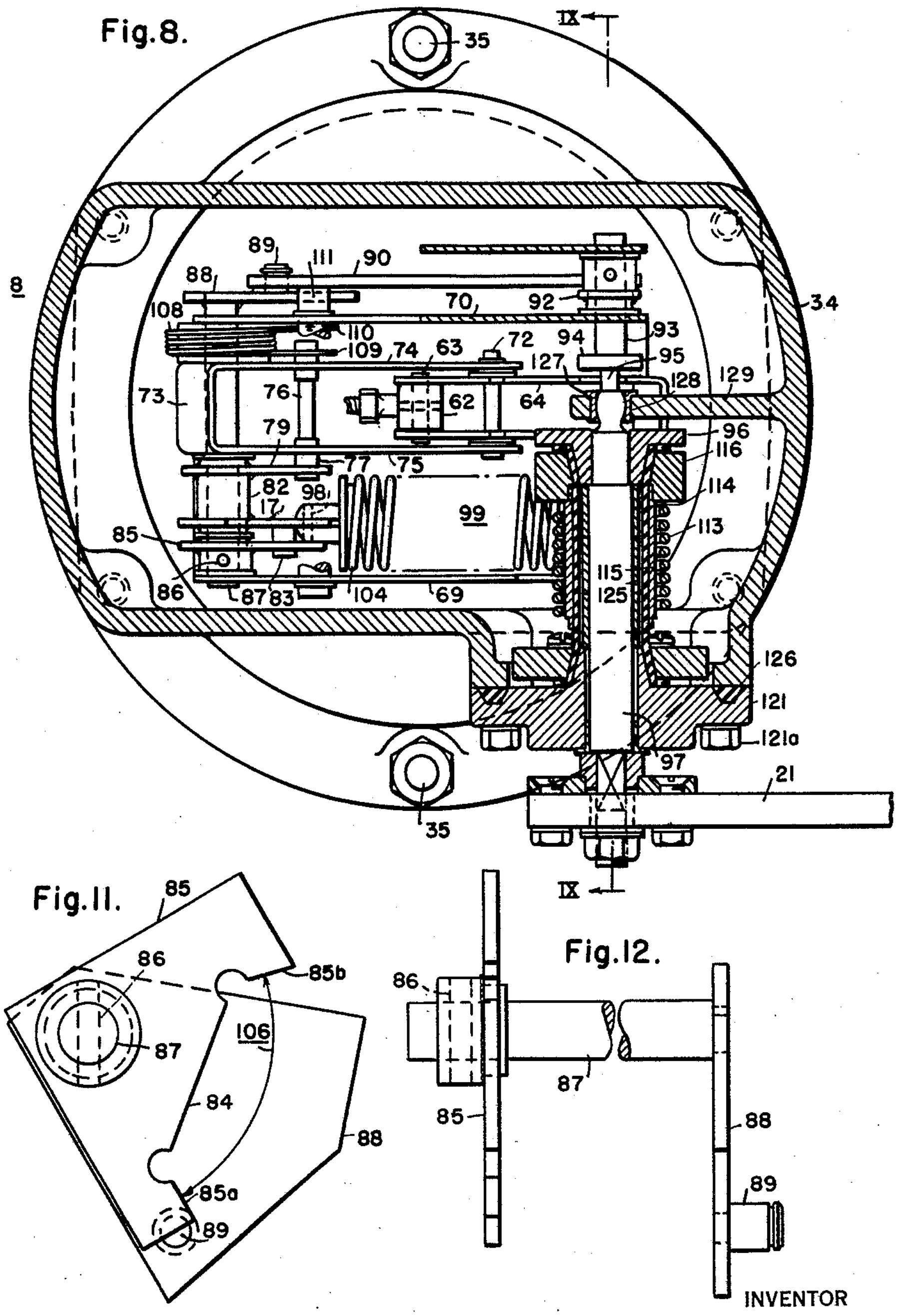
FIG. 8 is an enlarged plan sectional view taken along the line VIII—VIII of FIG. 3, with the contact structure being shown in the closed circuit position.
FIGS. 11 and 12 are end elevational and side views of the operator or lever arm of FIG. 10 shown in its assembled position.

Referring more particularly to FIG. 3, which not only shows the interrupting device 8, but also a portion of the mechanism therefor, it will be observed that there is provided a weatherproof outer porcelain casing 27 having flanges 28 and 29 secured to the upper and lower extremities thereof by any suitable cementing means, in this instance mineral lead 30. Preferably, bolts 31 (FIG. 1) are provided to rigidly secure the lower flange 29 to the top side of support casting 19. Also bolts 32 (FIG. 1) are provided to secure the upper flange 28 to a mechanism support 33, which in turn is secured to a mechanism housing or cover 34 by bolts 35 (FIG. 8). Since it is desirable to maintain a suitable arc-extinguishing gas interiorly within the weatherproof casing 27, gaskets 36 are employed between contiguously disposed parts, as shown in FIG. 3, to maintain a gas-tight seal.

As shown in FIG. 3, an interupter, or interrupting cylinder 38, formed of a zircon porcelain, or other suitable insulating material, is provided, being cemented at its upper end by mineral lead 39 to the mechanism support 33. Three apertures 40 are provided at the lower extremity of the zircon tube or puffer operating cylinder 38 having bolts 41 which secure a sleeve 42 of polytetrafluoroethylene. The sleeve 42 has three slots 43 (FIG. 16) provided therein equally spaced about the periphery of the sleeve 42 within which slidably move three pins 44, also formed of polytetrafluoroethylene, the inner ends of which are secured by a press fit to a cup-shaped guide member 45 also formed of polytetrafluoroethylene. The stationary contact 46 is fixedly secured to the guide member 45, as shown in FIG. 3. Disposed below the stationary contact 46 is a compression spring 47, which has its lower end seated in a bracket 48 which is secured to a contact plate 49 or terminal surface. The contact plate 49 is electrically connected by a flexible connector 50 to a top plate 51 to which a bracket 52 is secured, serving as an upper seat for the compression spring 47. Thus, the compression spring 47 biases the stationary contact 46 upwardly so that the pins 44 stop against the lower end 53 of the interrupter tube 38. The spring 47, therefore, not only provides a resilient mounting for the stationary contact 46, to prevent hammering of the contact 46 during the closing stroke, but also provides an electrical connection, together with the shunt 50, to the lower contact plate, or terminal surface 49, which in turn makes direct electrical connection with a contact surface, or contact plate portion 19*a* of the support casting 19, and hence to the line-terminal plate 18.

The reason that the parts 42, 44 and 45 are formed of polytetrafluoroethylene is that this material is not readily affected by high temperature, or the decomposition products resulting from arcing in sulfur hexafluoride gas, the extinguishing gas which fills the interior of the outer casing 27. The remarkable properties of this gas are set forth and claimed in U.S. patent application filed July 19, 1951, Serial No. 237,502, now United States Patent 2,757,261 issued July 31, 1956, to Harry J. Lingal, Thomas E. Browne, Jr., and Albert P. Strom, and assigned to the assignee of the instant application.

Cooperating with the stationary contact 46 is a movable rod-shaped contact 54, which is surrounded by a piston structure 55 which, when actuated, tends to compress the gas within the upper region 56 of the interrupter tube 38 to force this compressed gas through apertures 57 in a metallic plate 58, and through an orifice 59 into intimate engagement with the arc.

A check valve structure is provided at the upper end of the tube 38 including a laterally movable check valve plate 37, through an aperture 37*a* of which the contact rod 61 moves with slight clearance. This provides proper check valve action while at the same time permits slight misalignment of contact rod 54. The contact rod 54 is moved to its open and closed-circuit positions by a snap-acting mechanism, generally designated by the reference numeral 60 and enclosed within the mechanism cover 34, as more clearly shown in FIGS. 3, 8 and 9 of the drawings.

Figure 14:
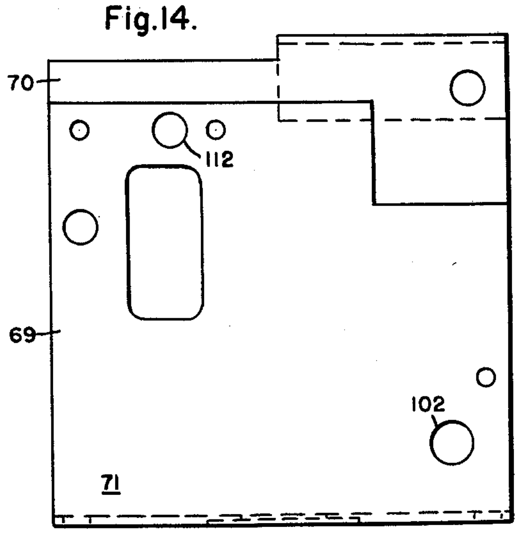
FIGS. 14 and 15 are side elevational and end views of the mechanism frame utilized in my improved load break disconnecting switch.
Figure 15:
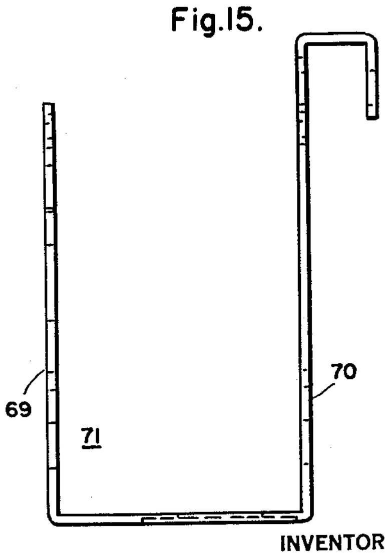

More specifically, the upper end 61 of the contact rod 54 is fixed secured to a block 62, which is pivotally mounted by a pin 63 to a guide link 64 having a somewhat channel-shaped configuration. The other end 65 of the link 64 is pivotally secured by a pin 66 to a U-shaped idler link 67, which has its lower end pivotally secured by a pin 68 between the sides 69, 70 of the mechanism frame, generally designated by the reference numeral 71 and more clearly shown in FIGS. 14 and 15 of the drawings.

Intermediate the pivotal connections 63, 66 is a pivotal connection 72 to a movable member or contact arm 73, which in this instance is of bifurcated construction and more clearly shown in FIG. 8 of the drawings. As observed in this figure the contact arm, or movable crank arm 73 has two side portions 74, 75 which have a laterally extending actuating pin 76 extending therethrough. One end 77 of the actuating or projecting pin 76 is disposed within a slot 78 of an actuator or operator 79 more fully shown in FIG. 13 of the drawings. As indicated in this figure the actuator 79 comprises two laterally spaced arms or projections 80, 81, which drive the pin 76 with a lost-motion connection. A sleeve bushing 82, more clearly shown in FIG. 8 of the drawings, rigidly connects a crank arm 17 to the actuator 79. The arm 17 has a laterally jutting actuating pin 83, which is disposed within a slotted portion 84 of an operator 85 which is pinned by a pin 86 (FIG. 11) to a shaft 87, which is journalled between the side plate 69, 70 of the mechanism frame 71.

Figure 9:
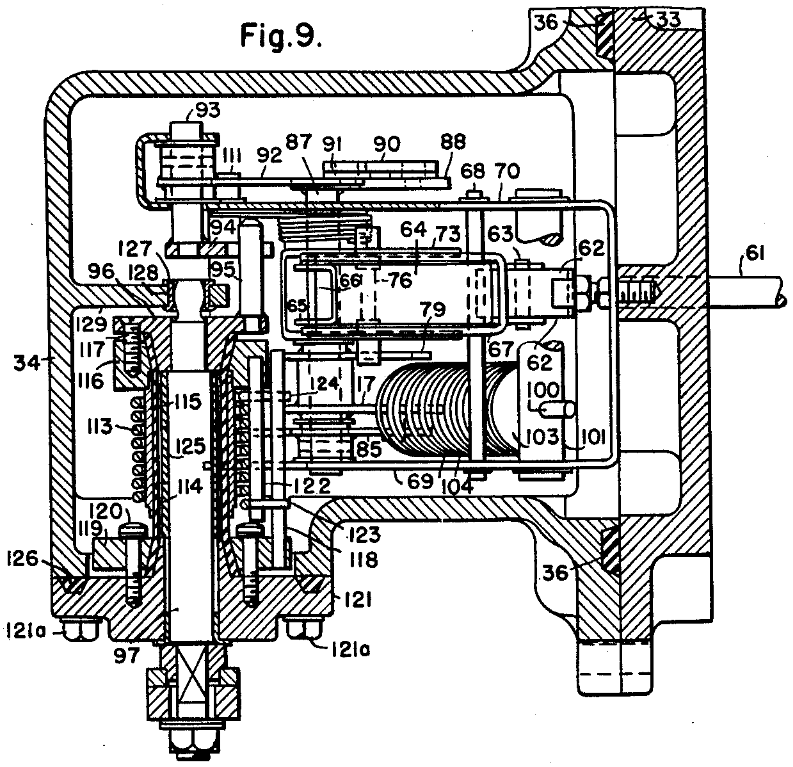
FIG. 9 is a fragmentary sectional view taken along the line IX—IX of FIG. 8, the mechanism being in the closed position.

As more clearly shown in FIG. 12, the shaft 87 is rotated by a lever 88 having a pin 89 jutting laterally therefrom. The pin 89 is in turn connected to a link 90, the other end of which is connected by a pin 91 to an arm 92 (FIG. 9). The arm 92 is pinned to a shaft 93, to which is secured a slotted operating crank 94. The crank 94 makes engagement with an operating pin 95, more clearly shown in FIG. 9 of the drawings, which is secured to a shaft seal 96. The shaft seal 96 is fixedly secured to a drive shaft 97, which extends externally of the mechanism cover 34 and is rotated by the operating crank arm 21.

Thus, during the opening operation, the main disconnecting switch blade 11 strikes the actuating pin 22 to cause counterclockwise rotation of the operating arm 21 and also its shaft 97. This will cause rotation of the operating pin 95 about the shaft 97 as a center. This will, in turn, effect rotation of the slotted operating crank 94, and through the links 92, 90 the rotation of lever 88. Since lever 88 is fixedly secured to shaft 87, this will effect rotation of operator 85. Since pin 83 is disposed within slot or lost-motion connection 84 of operator 85, between the projections 85*a*, 85*b* thereof, it will be moved therewith. To effect snap-action the crank arm 17 is pivotally connected by a pin 98 to an overcenter spring mechanism, generally designated by the reference numeral 99, and shown more clearly in FIGS. 4, 8 and 9 of the drawings. FIG. 4 shows a fragmentary view of the overcenter spring mechanism 99 in the closed circuit position of the device.

Briefly, the spring mechanism 99 comprises a spring guide rod 100, which passes through a shaft 101, the latter being supported between the two side plates 69, 70 of the mechanism frame by way of the apertures 102 provided therein, as shown in FIG. 9. The spring guide rod 100 also slidably passes through a spring seat 103, more clearly shown in FIG. 4 of the drawings. Thus, counterclockwise rotation of actuating pin 83 about shaft 87 as a center causes a slight compression of the spring 104 of the overcenter spring mechanism 99, and an extension of the spring guide rod 100 through the support shaft 101. When the overcenter spring mechanism 99 passes its center position, as indicated by the line 105 of FIG. 4, it will snap to the opposite side, free of the operator 85, because of the lost-motion afforded by the slot 84. The lost-motion between the operator 85 and the actuating pin 83 is designated by the reference numeral 106 in FIGS. 10 and 11.

The result of the snap-action of the overcenter spring mechanism 99 to the opposite side of the line of action 105 is to effect also counterclockwise rotation of the actuator projection 81, which is an integral part of the operating lever crank 79. The arm 81 has a second lost motion 107 with respect to the actuating pin 76 passing through the sides 74, 75 of the contact arm 73. Thus, the actuating pin 76 is not picked up by the projection 81 of actuator 79 until the spring mechanism 99 is almost on center. Note FIG. 4 in this connection.

Figures 5, 6, 7, 16:
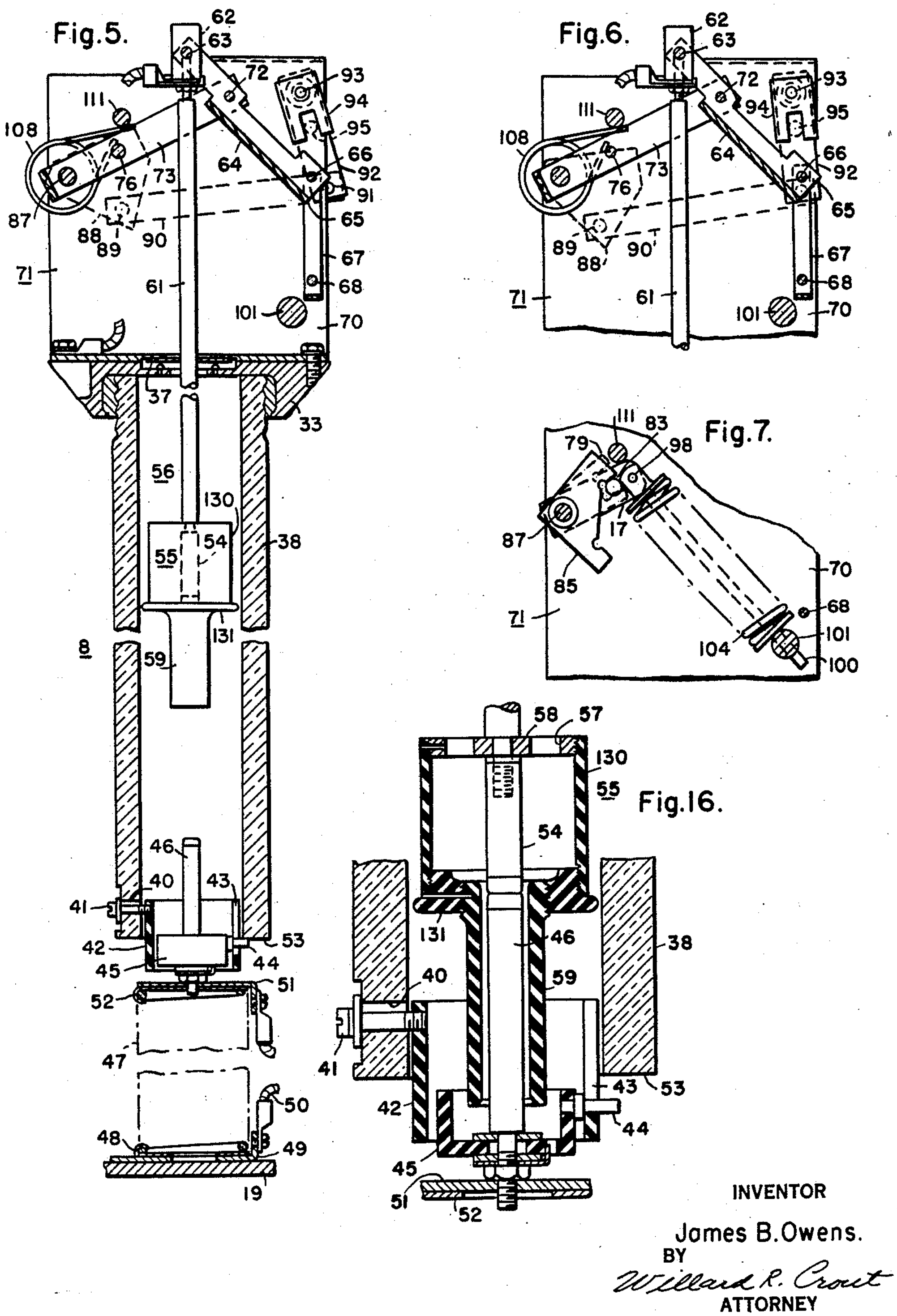
FIG. 5 is a view of the interrupting assembly, similar to that shown in FIG. 3, but indicating the position of the several parts in the fully open-circuit position, wherein the external operating arm has been moved to its extreme position by the main disconnecting switch blade.
FIG. 6 is a fragmentary view, similar to that shown in FIG. 5, but indicating the fully open-circuit position at which the externally disposed operating arm has returned to its neutral position.
FIG. 7 is a fragmentary view corresponding to that of FIGS. 5 and 6, but indicating the position of the overcenter biasing spring in the fully open-circuit position of the interrupting device.
FIG. 16 is an enlarged vertical sectional view of the piston and contact arrangement.

The result is that the movable contact 54 is not initiated toward its open-circuit position until the spring mechanism 99 is practically on center, and is substantially ready to move with a snap-action toward its open position, as indicated in FIG. 7, independently of movement of the operator 85, and hence through the linkage independently of motion of the external operating crank arm 21. The mechanism 60, therefore, provides snap-opening and snap-closing motion of the movable contact 54, independently and trip-free of the externally disposed operating arm 21 and the interposed linkage. This provides very fast high-speed opening motion of the movable contact 54 upwardly away from the stationary contact 46 to establish an arc therebetween.

In certain instances it may be desirable to maintain some contact pressure between contacts 54, 46 following picking up of the actuating pin 83 by the operator 85 and prior to engagement of the pin 76 by the projection 81 of actuator 79. For this purpose a helical spring 108 (FIG. 3) is supplied, which has one end 109 bearing downwardly against the pin 76 and has the other end 110 bearing upwardly against the stop shaft 111. The stop shaft 111 is journalled between the sides 69, 70 of the frame 71, passing through the apertures 112 therein provided for this purpose. The stop shaft 111 is engaged by the upper side of the crank arm 17 at the end of the opening operation. The construction is such that when the upper side of the arm 17 strikes the stop shaft 111, at the same time the upper sides of the side portion 74, 75 strike the stop shaft 111, thereby halting the opening motion of the several parts, as shown in FIGS. 5–7.

Preferably, I provide a construction in which the externally disposed operating arm 21 is biased toward a neutral position as shown in FIG. 1 of the drawings. This is brought about by the provision of centering means including a centering spring 113 which encircles a rubber sleeve 114, which provides a gas-tight seal along the shaft 97. Preferably, externally of the rubber sleeve 114 is a metallic protecting sleeve 115 which is driven by a press fit into a ring seal clamp 116 secured by screws 117 to the shaft seal 96. A stop rod 118 is stationarily fixed to a ring seal clamp 119, the latter being fixed by bolts 120 to cover plate 121. The plate 121 is fixed to cover 34 by bolts 121*a*.

Movable with the shaft seal 96 is a laterally jutting pin 122 which makes engagement with one end 123 of the spring 113 in one direction and with the end 124 of the spring in the opposite direction. Thus, the centering spring 113 always tends to return the operating arm 21 to its neutral position, as shown in FIG. 1, following disengagement therefrom by the disconnecting switch blade 11, this all being brought about by the centering spring 113.

Interiorly of the rubber sleeve 114, and immediately surrounding the drive shaft 97 are a plurality of separate metallic sleeves 125, which serve to reduce the friction on the rubber sealing sleeve 114. The use of the plurality of metal sleeves or separate ring portions 125 positioned axially along the drive shaft 97 is desirable because the pressure of the gas within the casing could otherwise hold the rubber sleeve 114 tightly against the shaft 97 and cause most of the twisting stress to be concentrated on a short section of the rubber sleeve 114. The relative motion between the various metallic portions 125 distributes the twisting sress along the rubber sleeve 114. A suitable gasket 126 is provided to provide a gas-tight seal between the mechanism cover 34 and the cover plate 121. As shown in FIG. 8, the interior end of the drive shaft 97 is journalled within a bushing 127 seated within an opening 128 provided in a boss 129 integrally formed with the mechanism cover 34, which is of casting form. Thus, the entire centering mechanism and the cover plate 121 may be removed laterally out of the mechanism cover 34 as a unit, the pin 95 merely withdrawing from the slotted operating crank 94.

During the closing operation the sequence is the reverse of that previously set out in the opening operation, namely causing swinging movement of the main disconnecting switch blade 11 to engage the outer free end 10 thereof with the actuating pin 22 forming the single end portion of operating arm 21. This will cause slight clockwise rotation of operating arm 21 and hence of drive shaft 97. Such motion will cause clockwise rotation of operating pin 95 which will effect rotation of slotted operating crank 94. Through the linkage 92, 90 and lever 88 there will result clockwise rotation of shaft 87 with corresponding clockwise rotation of slotted portion 84 of operator 85. This will cause engagement between actuating pin 83 and the upper end 85*b* of operator 85. This will move operating lever crank 79 clockwise about drive shaft 97 meanwhile stressing the overcenter spring mechanism 99. When the line of action of the overcenter spring mechanism 99 passes across the line of action 105 (FIG. 4), it will cause the crank arm 17 to snap toward the closed position, causing the pin 76 to be picked up by the upper arm 80 of the operator 79 to force the movable contact 54 to engage the stationary contact 46 against the resilient action afforded by the compression spring 47. This will force the stationary contact 46 downwardly until the pins 44 strike the bottom of the slots 43, at which time the contact pressure will be provided both by the helical spring 108 and by the component of force exerted by the overcenter compression spring 104 acting through the linkage upon the movable contact.

Subsequently, the main disconnecting switch blade 11 will engage the stationary jaw contact 9 to shunt the circuit through the interrupting device 8.

To briefly recapitulate the opening operation, the switch is operated from the closed to the open position by a manual or motor operating mechanism which serves to rotate the insulator column 2. The first 30 angular degrees of rotation causes the blade 11 to rotate about its axis to give a contact wiping and powerful ice-breaking action while releasing the pressure of the stationary contact jaws 9. The second 30 degrees of insulator rotation causes the blade 11 to rise from the stationary contact 9 thus diverting the current flow to a path through the interrupter 8, the contact 25, and the interrupter isolating blade 23. After the insulator has been rotated a total of 60 degrees the main switch blade 11 engages the arm 21 on the interrupter housing which trips an over-center toggle mechanism to cause contacts to part at high speed within the interrupter 8. The flow of current is interrupted by this action without any external display. After tripping the interrupter mechanism, further rise of the main blade 11 causes the arm to engage the interrupter isolating blade 23. The two blades 11, 23 then rise together during the final 40 degrees of rotation of the driving insulator 2 to establish the full visible air gap required in the disconnecting switch 6.

From the foregoing description it will be apparent that I have improved the operating mechanism of the load-break disconnecting switch, as set out in the aforesaid Patent 2,769,063 and have improved the interrupter by the provision of a cylinder or shield member 130 which prevents flashover about the piston 131 between the stationary and movable contacts. Thus, high-velocity gas flow interiorly through the orifice 59 results in high-dielectric-strength conditions at this region between the separated contacts 54, 46 to readily withstand the high voltage gradient therebetween. Breakdown following interruption of the arc will not occur at this point.

On the other hand, relatively stagnant gas-flow conditions adjacent the inner wall of operating cylinder 38 externally of the piston 131 provides a lower dielectric strength at this point, and voltage breakdown following arc interruption has been observed to occur at this point. I have discovered that the use of the cylindrical shield 130 extending rearwardly of the piston 131 has completely eliminated the possibility of breakdown or flashover occurring between the contacts 46, 54 externally of the piston 131 along the inner wall of the operating cylinder 38. By having a smaller external diameter than the piston 131, the cylindrical shield member 130 does not rub on the inner wall of the operating cylinder 38, and hence there results no frictional losses as a result of its employment. Also the provision of the resilient mounting as afforded by the compression spring 47 prevents hammering of the stationary contact 46 during closing, and the snap-acting mechanism provides high-speed effective operation of the contact structure independently of continued movement of the externally disposed operating arm 21. The first lost-motion 106 insures that the mechanism 60 will be independent of motion of the operating arm 21, and the second lost motion 107 insures that the movable contact 54 will not be picked up until the overcenter spring mechanism 99 is practically ready to be snapped to the opposite side of the line of action 105.

The invention also makes possible the use of a single-ended crank for operating the interrupter mechanism by providing biasing means for returning the structure to a position in which the end portion of the crank is engaged upon return movement of the end portion of the switch blade during both its opening and closing movement.

The interrupting assembly, as shown in FIG. 5, may be assembled, adjusted, and tested prior to placing within the outer casing 27, the spring 47 providing the requisite pressure between terminal surface 49 and contact surface 19*a* of support casting 19.

Although I have shown and described a specific structure, it will be clearly apparent that the same was merely for the purpose of description, and that changes and modifications may readily be made therein by those skilled in the art without departing from the spirit and scope of the invention.

I claim as my invention:

1. A fluid-blast longitudinal-flow circuit interrupter including a relatively stationary operating cylinder, an annular piston disc movable longitudinally of said operating cylinder interiorly thereof to compress fluid therein, relatively movable contact structure including a post-type relatively stationary contact and a rod-shaped cooperable movable contact, a conducting operating rod movable longitudinally of said operating cylinder and having one end thereof connected to said rod-shaped movable contact, a movable supporting spider of smaller outer diameter than the internal diameter of the operating cylinder secured to the operating rod at the point of attachment of the movable rod-shaped contact with the operating rod, a cylindrical shield member of smaller outer diameter than the internal diameter of the operating cylinder secured at one end to said movable spider and extending toward the stationary contact surrounding the rod-shaped movable contact, the other end of the cylindrical shield member being secured to said movable piston disc to cause the actuation thereof, an insulating elongated tubular-like orifice member having an elongated orifice opening therein secured to said piston disc and movable therewith, the arrangement causing the contact-tip portion of the rod-shaped movable contact to be positioned closely adjacent the inlet portion of the orifice opening with annular clearance completely around the tip portion of the movable contact for unimpeded fluid flow, the post-type relatively stationary contact extending through the elongated orifice opening to engage the movable contact in the closed position of the interrupter, a resulting longitudinal flow through the elongated orifice opening during the opening operation causing extinction of the arc established axially of the elongated orifice opening, said cylindrical shield member preventing flashover externally of the piston disc following arc interruption, and the relatively small diameter of the shield member and spider preventing the occurrence of frictional losses along the operating cylinder during the opening operation.

2. A circuit interrupting device including an outer elongated insulating weatherproof cylindrical casing having a terminal surface closing one end thereof, the other end of said elongated weatherproof insulating casing being open, an elongated unitary interrupting assembly adapted to be removably inserted into said other open end of said outer elongated weatherproof casing, said elongated unitary interrupting assembly having a relatively stationary contact and a cooperable movable contact movable longitudinally of the elongated unitary interrupting assembly, operating means disposed adjacent one end of the elongated unitary assembly for mechanically moving the movable contact toward said one end of the assembly, said relatively stationary contact being disposed adjacent the other end of said elongated assembly, compression-spring means carrying a terminal surface at one end thereof and secured to said relatively stationary contact at the other end thereof, said assembly including an insulating support cylinder for supporting the relatively stationary contact for limited relative movement and the associated compression-spring means, and said last-mentioned terminal surface being the first part of the assembly to be inserted into the open end of the weatherproof casing and spaced away from said insulating support cylinder so that the two terminal surfaces are in contacting engagement.

3. A circuit interrupting device including an elongated cylindrical outer casing having a contact surface adjacent one end thereof and open at the other end, a unitary interrupting assembly including a relatively stationary contact and a movable contact, a compression spring for resiliently mounting the relatively stationary contact and having a terminal surface adjacent one end thereof, said unitary interrupting assembly also including an inner puffer operating cylinder which supports said relatively stationary contact for limited relative movement and also said compression spring, a movable piston carried by said movable contact, said compression spring constituting the sole support for said terminal surface, said terminal surface being spaced from the inward extremity of said inner puffer operating cylinder, and said interrupting assembly being inserted into the other end of the outer casing following external adjustment and positioned with the two surfaces in engagement.

4. A circuit interrupting device including an outer elongated insulating cylindrical casing having a substantially flat terminal surface closing one end thereof, the other end of said elongated insulating casing being open, an elongated unitary interrupting assembly adapted to be removably inserted into said other open end of said outer elongated casing, said elongated unitary interrupting assembly having a relatively stationary contact and a cooperable movable contact movable longitudinally of the elongated unitary interrupting assembly, operating means disposed adjacent one end of the elongated unitary assembly for mechanically moving the movable contact toward said one end of the assembly during the opening operation, said relatively stationary contact being disposed adjacent the other end of said elongated assembly, compression-spring means constituting a part of said unitary interrupting assembly and carrying a terminal surface at one end thereof and secured to said relatively stationary contact at the other end thereof, the compression-spring means constituting the sole support for said last-mentioned terminal surface, said last-mentioned terminal surface being the first part of the assembly to be inserted into the open end of the outer casing so that the two terminal surfaces are in contacting engagement, and the two terminal surfaces making separable abutting engagement in the operative condition of the unitary interrupting assembly.

5. The combination of claim 4, wherein the series current through the unitary interrupting assembly is entirely carried by the turns of the compression-spring means.

6. A fluid-blast longitudinal-flow type of circuit interrupter including an outer elongated tubular weatherproof insulating casing, terminal means disposed adjacent one end of the elongated weatherproof insulating casing and completely closing the same, the other end of the weatherproof casing being open, a piston-type elongated unitary interrupting assembly adapted for insertion and removal from said open end of the elongated insulating weatherproof casing and having an enlarged mechanism housing adapted for seating upon the open end of the weatherproof casing, said unitary removable interrupting assembly including a piston, movable contact and orifice member, the movable contact and orifice member being movable together during the opening and closing operations, said unitary assembly also including a puffer cylinder, a relatively stationary contact supported for limited relative movement by the interior end of said puffer cylinder, contact biasing spring means for biasing said relatively stationary contact, means defining a removable terminal surface for said unitary assembly spaced from said interior end of the puffer cylinder, said spring means constituting the sole support for said removable terminal surface, and a snap-acting over-center toggle mechanism disposed within said enlarged mechanism housing for effecting snap-opening and snap-closing movement of the orifice and movable contact longitudinally of the outer elongated tubular weatherproof insulating casing.

7. A fluid-blast circuit interrupter including an outer tubular insulating casing, means defining a terminal surface closing one end of said tubular outer casing, a unitary interrupting assembly adapted to be removably inserted into the other open end of said outer tubular casing, the unitary interrupting assembly including a mechanism housing disposed at one end thereof and an elongated puffer cylinder, said puffer cylinder supporting a relatively stationary contact for limited relative movement adjacent one end thereof, the stationary contact in turn supporting a biasing compression spring therefor having a terminal surface at the remote end thereof spaced from the interior end of the puffer cylinder, a cooperable movable contact carrying a piston operable longitudinally within said elongated puffer cylinder, the puffer cylinder being adapted to be inserted interiorly within said outer tubular insulating casing with the mechanism housing disposed at said other end of the outer tubular insulating casing generally externally thereof, and the terminal surfaces making separable abutting engagement in the operative condition of the fluid-blast circuit interrupter.

8. A fluid-blast circuit interrupter including an outer tubular weatherproof insulating casing, means defining a relatively flat terminal surface closing one end of said tubular outer weatherproof casing, a unitary interrupting assembly adapted to be removably inserted into the other open end of said outer tubular weatherproof casing, the unitary interrupting assembly including a mechanism housing disposed at one end thereof and an elongated puffer cylinder, said puffer cylinder supporting a relatively stationary contact adjacent one end thereof for limited relative movement, the stationary contact in turn supporting a biasing compression spring therefor having a terminal surface at the remote end thereof spaced away from said end of the puffer cylinder, a cooperable movable contact carrying a piston operable longitudinally within said elongated puffer cylinder, the puffer cylinder being adapted to be inserted interiorly within said outer tubular insulating casing with the mechanism housing disposed at said other end of the outer tubular insulating casing generally externally thereof, the terminal surfaces making separable abutting engagement in the operative condition of the fluid-blast circuit interrupter, and stop means disposed adjacent said one end of the puffer cylinder associated with said limited relative movement for limiting the expansion of said biasing compression spring in the open circuit position of the circuit interrupter.

(References on following page)

References Cited in the file of this patent

UNITED STATES PATENTS

| | | |
|---|---|---|
| Re. 21,848 | Balachowsky | July 1, 1941 |
| 429,611 | Facer | June 10, 1890 |
| 1,562,738 | Burham | Nov. 24, 1925 |
| 2,111,416 | Balachowsky | Mar. 16, 1938 |
| 2,117,261 | Thommen | May 10, 1938 |
| 2,429,311 | Gay | Oct. 21, 1947 |
| 2,442,010 | Leeds et al. | May 25, 1948 |
| 2,757,261 | Lingal et al. | July 31, 1956 |
| 2,853,584 | Upton | Sept. 23, 1958 |
| 2,889,434 | Lingal | June 2, 1959 |

FOREIGN PATENTS

| | | |
|---|---|---|
| 6,254 | Germany | Dec. 13, 1878 |
| 567,090 | Great Britain | Jan. 26, 1945 |
| 605,163 | Great Britain | July 16, 1948 |